United States Patent [19]
Rajeshwar et al.

[11] Patent Number: 5,368,632
[45] Date of Patent: Nov. 29, 1994

[54] REDOX POLYMER FILMS FOR METAL RECOVERY APPLICATIONS

[75] Inventors: Krishnan Rajeshwar; Chang Wei; Sanjay Basak, all of Arlington, Tex.

[73] Assignee: Board of Regents, The University of Texas System, Austin, Tex.

[21] Appl. No.: 43,517

[22] Filed: Apr. 6, 1993

[51] Int. Cl.$^5$ .............................................. C22B 3/24
[52] U.S. Cl. ...................................... 75/721; 423/22; 423/DIG. 14
[58] Field of Search ..................... 423/DIG. 14, 22; 75/721

[56] References Cited

U.S. PATENT DOCUMENTS 5,131,943  7/1992  Allison ........................ 423/DIG. 14

OTHER PUBLICATIONS

Agarwal et al., "Electrodeposition of Six Heavy Metals on Reticulated Vitreous Carbon Electrode," *Water Res.*, 18(2):227–232, 1984.
Anderson et al., "Effects of Chromium Supplementation on Urinary Cr Excretion of Human Subjects and Correlation of Cr Excretion with Selected Clinical Parameters," *J. Nutr.*, 113:276–281, 1983.
Bose et al., "Preparation, Voltammetric Characterization, and Use of a Composite Containing Chemically Synthesized Polypyrrole and a Carrier Polymer," *J. Electrochem. Soc.*, 139(9):L75–L76, 1992.
Mayer and Schick, "Removal of Hexavalent Chromium from Estuarine Waters by Model Substrates and Natural Sediments," *Environmental Science & Technology*, 15(12):1482–1484, 1981.
Morris et al., "Evidence of Chromium Toxicity in a Group of Stainless Steel Welders," *Atomic Spectroscopy*, 6(6):149–151, 1985.
Schroeder and Lee, "Potential Transformations of Chromium in Natural Waters," *Water, Air, and Soil Pollution*, 4:355–365, 1975.
Tsai et al., "Anion-Exchange Behavior of Polypyrrole Membranes," *J. Phys. Chem.*, 92:3560–3565, 1988.
Wei et al., "Reduction of Hexavalent Chromium in Aqueous Solutions by Polypyrrole," *J. Electrochem. Soc.*, 140(4):L60–L62, 1993.

*Primary Examiner*—Peter D. Rosenberg
*Attorney, Agent, or Firm*—Arnold, White & Durkee

[57] ABSTRACT

The treatment of solutions of metal ions with redox polymers under conditions to reduce the ions to a lower valence. The resulting solutions of the lower valence ions are separated from the polymers, and the polymers are regenerated for further use in such treatment. The method of the invention is employed to convert high valence, toxic metal ions to lower valence ions of reduced toxicity. Preferably, the electronically conductive polymer is mounted on a suitable support, and a solution of the toxic metal ion is brought into contact with the polymer. A variety of redox polymers, in particular, electronically conductive polymers, may be used in the practice of the invention, and individual such polymers may be structurally altered to suit particular metal ions. Polymers especially contemplated for use in the invention are polypyrroles, polyanilines and polythiophenes. All of these polymers are characterized as redox polymers with a positive charge on their backbones. In general, suitable polymers are redox polymers bearing a positive charge on their backbones with an $E_o$ of the (surface) redox couple sufficiently negative to react with a metal ion of interest. Thus, for example, an $E_o$ more negative than 1.16V is preferred for the recovery of Cr(VI).

25 Claims, 3 Drawing Sheets

REDOX POLYMER FILMS FOR METAL RECOVERY APPLICATIONS

FIELD OF THE INVENTION

The present invention relates to environmental remediation of industrial effluents, in particular, the use of conducting polymers for the treatment and recycling of chromium or other metals from process streams. The recovery of such metals, where desired, may be useful for purposes other than environmental remediation.

BACKGROUND OF THE INVENTION

An increasing sensitivity to the adverse environmental impacts of technology in industrialized nations has resulted in a remediation philosophy which has evolved from pollution control by dilution (e.g. burial, incineration), to waste minimization, and now to pollution prevention and "zero emission" technologies. As a measure of the magnitude of the toxic waste problem, the U.S. environmental industry in 1990 amounted to $132 billion of which water treatment, purification, delivery and treatment comprised $15.4 billion and hazardous waste management accounted for another $15.1 billion (*Environmental Business Journal*, 1991). Industries are spending enormous sums of money for the disposal of toxic wastes; thus new technologies for in house remediation and recycling of chemicals are badly needed. The proposed patent invention described below is a contribution to this technological void.

Electronically conductive polymers such as polypyrrole are being considered for a variety of devices and applications including secondary rechargeable batteries, fuel cells, chemical sensing, controlled drug delivery, electrochromics, corrosion protection, antistatic formulations, and radar absorption (Kanatzidis, 1990; Studt, 1991). U.S. patent application Ser. No. 07/931,212, which is incorporated herein by reference, describes polymer films with colloidal catalytic particles homogeneously dispersed therein.

SUMMARY OF THE INVENTION

The invention in a broad aspect comprises the treatment of solutions of metal ions with redox polymers under conditions to reduce the ions to a lower valence. The resulting concentrated solutions of the lower valence ions are separated from the polymers, and the polymers are regenerated for further use in such treatment. A preferred redox polymer is an electronically conductive polymer.

In a more specific aspect, the method of the invention is employed to convert high valence, toxic metal ions to lower valence ions of reduced toxicity. Preferably, an electronically conductive polymer is mounted on a suitable support, and a solution of the toxic metal ion is brought into contact with the polymer. In one preferred embodiment, a film of polymer is mounted on a support in the form of a platinum grid.

A variety of electronically conductive polymers may be used in the practice of the invention, and individual such polymers may be structurally altered to suit particular metal ions. Polymers especially contemplated for use in the invention are polypyrroles, polyanilines and polythiophenes. All of these polymers are characterized as redox polymers with a positive charge on their backbones. In general, suitable polymers are redox polymers bearing a positive charge on their backbones with an $E_o$ of the (surface) redox couple sufficiently negative to react with a metal ion of interest. Thus, for example, an $E_0$ more negative than 1.16 V is preferred for the recovery of Cr(VI).

The invention has particular application in the environmental area, where it is useful in reducing the valence of toxic ions such as the Cr(VI) ion to the Cr(III) ion. Numercus other metal ions include Cd(II), Pb(II) and Hg(II). In a preferred form of the invention, an aqueous solution of one or more metal ions is contacted with a film of a polypyrrole or other suitable redox polymer for a period of time sufficient to reduce the ions to a desired lower valence; and the resulting solution then separated or otherwise removed from contact with the polymer. The reduced metal ion or ions may then be separated from the resulting solution in any suitable manner. A preferred separation method is electrochemical stripping wherein a positive potential applied to the film causes the metal to dissolve as ionic species.

The present invention has been demonstrated to be especially effective in the treatment of Cr(VI) with polypyrrole to yield Cr(III). Chromium occurs in two common oxidation states in nature, Cr(III) and Cr(VI). Hexavalent chromium is toxic and carcinogenic. Because it is only weakly sorbed onto inorganic surfaces, Cr(VI) also is notoriously mobile in nature. On the other hand, Cr(III) is readily precipitated or sorbed on a variety of inorganic and organic substrates at near neutral Thus, reduction of chromium to the trivalent state usually serves to immobilize it. The environmental importance of this process derives from the variety of sources which generate Cr(VI) in effluent streams; for example, chrome plating, electronic, metallurgical, timber, and leather tanning industries.

In a broad aspect, the present invention provides a method of metal recovery from an aqueous solution comprising reaction of a metal ion with a form of a redox polymer capable of reducing the metal ion. The metal ion may be a toxic waste product or a heavy metal ion, such as Cr(VI), Cd(II), Pb(II) or HG(II). A preferred redox polymer is an electronically conductive polymer, such as polypyrrole, polyaniline or polythiophene, having an $E^o$ more negative than the $E^o$ of the metal ion.

A preferred embodiment of the present invention is a method of metal recovery wherein the redox polymer is polypyrrole and the method includes the steps of; reacting a metal ion with polypyrrole to form a reduced metal ion and polypyrrole$^+$, doping the polypyrrole$^+$ by incorporation of anions, regenerating polypyrrole from doped polypyrrole$^+$ by electrochemical reduction, and recovering the reduced metal ion. The metal ion may be Cr(VI), Cd(II), Hg(II), or Pb(II), and the reduced metal ion may be Cr(III), Cd$^o$, Hg$^o$ or Pb$^o$, respectively. For purposes of the present invention, a reduced metal ion may be a metal in its neutral state. The anions comprise anions present in the supporting electrolyte and, in particular, may be $HSO_4^-$ anions.

The reduced metal ion may be recovered by sorption, precipitation, immobilization or electrochemical stripping. Electrochemical stripping includes the application of a positive potential where the reduced metal ion dissolves as an ionic species.

A particularly preferred embodiment of the present invention is a method of Cr(VI) recovery comprising the steps of; i) reacting Cr(VI) with polypyrrole to form Cr(III) and polypyrrole$^+$, ii) doping the polypyrrole$^+$ by incorporation of anions, iii) separating the doped polypyrrole+ from the Cr(III), iv) regenerating polypyrrole from the separated polypyrrole+ by electrochemical reduction; and v) recovering the Cr(III) by sorption or precipitation.

A further embodiment of the present invention is a method of reducing the valence of a heavy metal ion from a first ionic valence form to a second ionic valence form wherein both forms are water soluble. The method comprises contacting an aqueous solution of the first form with a film of a redox polymer having a sufficiently negative potential, said contacting being for a time sufficient to reduce the first said form to the second said form, separating the resulting solution from the polymer film, and regenerating the resulting separated polymer film by electrochemical reduction.

An aspect of the present invention is a method of reducing the toxicity of an aqueous solution of a toxic metal ion. This method comprises contacting the solution with a film of redox polymer having an electrode potential sufficiently negative to reduce the valence of the metal to a lower, less toxic valence; such contacting being for a time sufficient for the reduced valence metal to be formed, and separating the resulting solution from the resulting film. This method may further comprise recovering the metal in its lower valence form from the resulting solution when the lower valence form is soluble in the resulting solution, or electrochemically oxidizing the metal in its lower valence form when the lower valence form exists as a deposit on the resulting film, removing the oxidized metal from said resulting film, and electrochemically reducing the resulting film following such removal. The toxic metal ion may be Cr(VI), and the redox polymer may be polypyrrole having an $E^o$ more negative than 1.16 V.

A composition of matter of the present invention is a redox polymer having incorporated reduced metal ions formed by reacting a reduced redox polymer with oxidized metal ions.

One skilled in the art will understand that with rather straightforward modifications in the chemical architecture of any given conductive polymer, metal ions such as $Cr^{6+}$, $Cd^{2+}$, $Pb^{2+}$, $Hg^{2+}$, etc. may be immobilized and recycled upon demand.

BRIEF DESCRIPTION OF THE DRAWINGS

FIG. 2B shows control experiments yielding four overlapped spectra of a similar solution treated with bare Pt mesh for periods up to 30 min.

DETAILED DESCRIPTION OF THE PREFERRED EMBODIMENTS

In a preferred embodiment, spontaneous electron transfer, along with anion uptake by doping, form the basis for the reduction of toxic Cr(VI) using an electronically conductive polymer, e.g., polypyrrole. Experiments are described which show that aqueous sulfuric acid solutions containing 5-100 ppm Cr(VI) can be thus converted at ~100% efficiency to the environmentally more tractable Cr(III) species at time intervals spanning several minutes. The reversibility of the polymer redox process enables the electrochemical recycling of polypyrrole for repeated treatment of Cr(VI). The key advantages relative to the chemical. and electrochemical cleanup strategies currently employed include those related to material recyclability, selectivity, and efficiency at low (ppm) Cr(VI) levels.

Unless defined otherwise, all technical and scientific terms used herein have the same meaning as commonly understood by one of ordinary skill in the art to which this invention pertains. Although many methods and materials similar or equivalent to those described herein may be used in the practice or testing of the present invention, preferred methods and materials are described below. All publications mentioned hereunder are incorporated herein by reference. Unless mentioned otherwise, the techniques described herein for use with the invention are standard methodologies well known to persons of ordinary skill in the art.

As noted earlier, the present invention demonstrates, in one preferred embodiment, that treatment of Cr(VI) with polypyrrole yields Cr(III). Chromium occurs in two common oxidation states in nature, Cr(III) and Cr(VI). Hexavalent chromium is toxic and carcinogenic. (Florence and Battey, 1980; Morris et al., 1985; Anderson et al., 1983). Because it is only weakly sorbed onto inorganic surfaces (Schroeder and Lee, 1975; Mayer and Schick, 1981), Cr(VI) also is notoriously mobile in nature (Ku, 1980; Calder, 1988). On the other hand, Cr(III) is readily precipitated or sorbed on a variety of inorganic and organic substrates at near neutral Ph. (Schroeder and Lee, 1975; Kleber and Helz, 1992). Thus, reduction of chromium to the trivalent state usually serves to immobilize it. The environmental importance of the present invention derives in part from the variety of sources which generate Cr(VI) in effluent streams: chrome plating, electronic, metallurgical, timber, and leather tanning industries to name a few.

Figure 1:
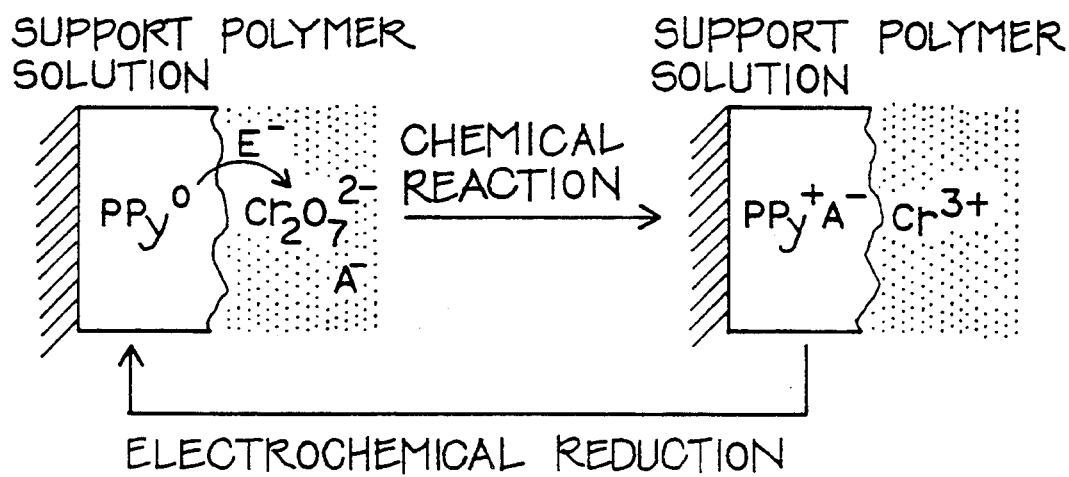
FIG. 1 demonstrates toxic waste cleanup using polypyrrole (PPy). Cr(VI) in acidic media (e.g., $H_2SO_4$) may be converted Cr(III) using a scheme involving three component steps: chemical reaction with electron transfer from $Ppy^0$ to Cr(VI), polymer "doping" and charge compensation by incorporation of anions $A^-$ ($A^- = HSO_4^-$ and $Cr_2O_7^{2-}$), and finally the regeneration of $Ppy^0$ from $Ppy^+$ by electrochemical reduction.

The approach to treating for Cr(VI) is schematized in FIG. 1 and is concluded to be based on two routes to the reduction of Cr(VI) levels in the solution. First, contact of an (electrochemically reduced) polypyrrole film with a dichromate solution at open circuit results in an immediate discoloration of the solution. Polypyrrole films tested were anodically grown at 0.90 V on 4 cm² Pt mesh (Alfa) supports using aqueous solutions of 0.1M pyrrole and 0.1M KCl. A three-electrode electrochemical cell configuration with a Pt counterelectrode and a Ag/AgCl/3.0M Kcl reference was used. (All potentials herein are quoted with respect to Ag/AgCl reference.) The charge consumed in the polymerization was monitored and nominally controlled to 16 C. After synthesis, the films were transferred to 0.1M Kcl and reduced at −0.90 V for 20-30 min prior to treatment with Cr(VI). The films were thoroughly washed before transfer to the dichromate solutions, whose nominal volume was 2 ml.

Figure 2A:
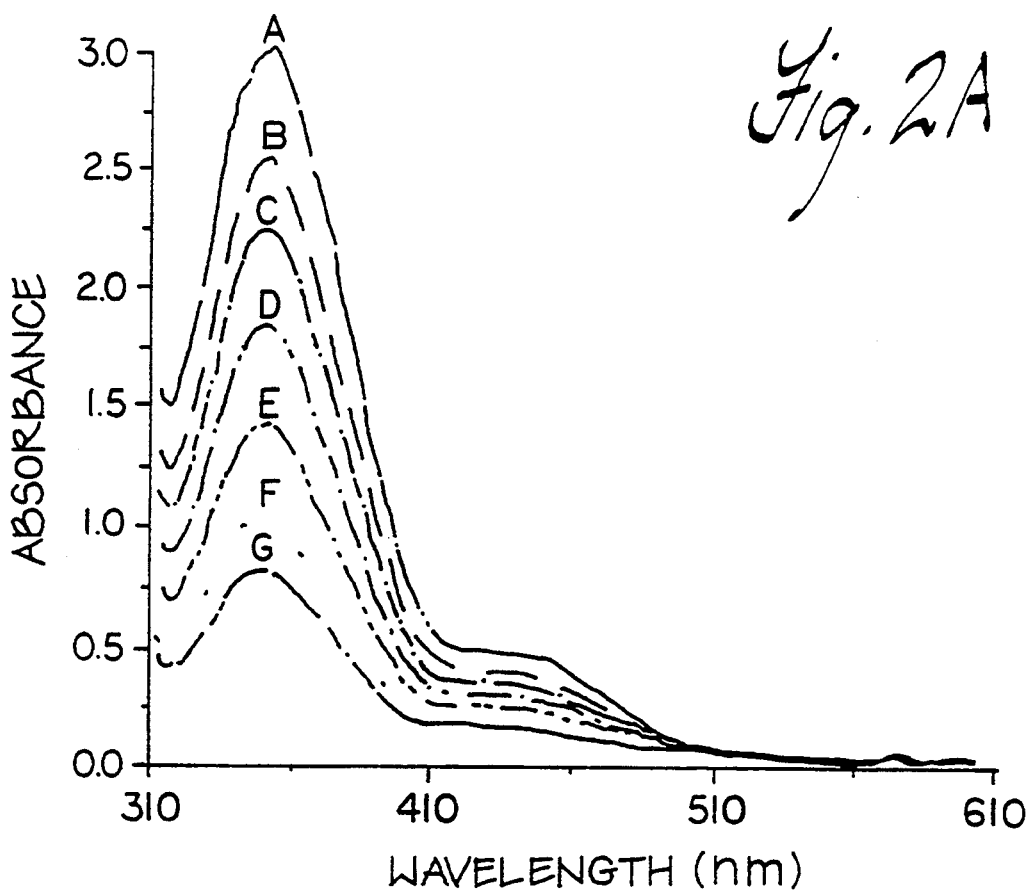
FIG. 2A and 2B show the background-corrected UV-visible spectra of a 1 mM $K_2Cr_2O_7$+0.1M $H_2SO_4$ solution as a function of time after treatment with Pt-supported polypyrrole at open circuit (~0.40 V): (A) fresh, (B) 2 min, (C) 5 min, (D) 10 min, (E) 20 min, (F) 30 min, and (G) 40 min.
Figure 2B:
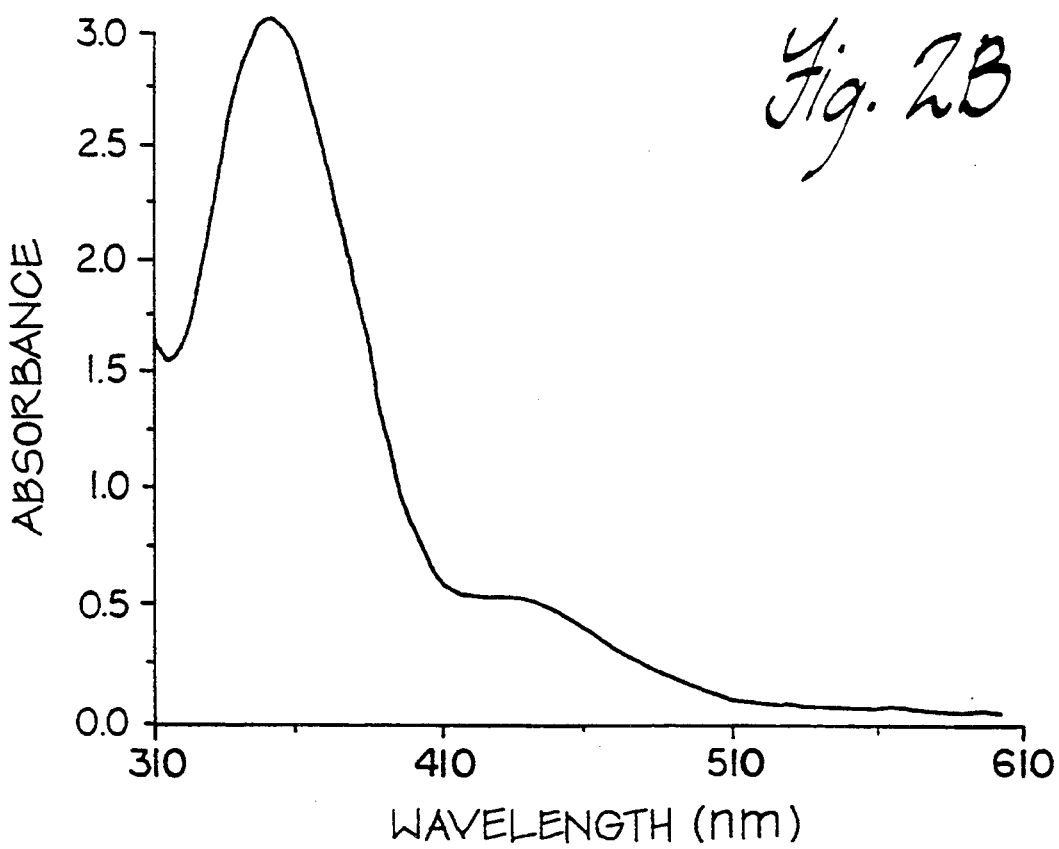
Figure 3A:
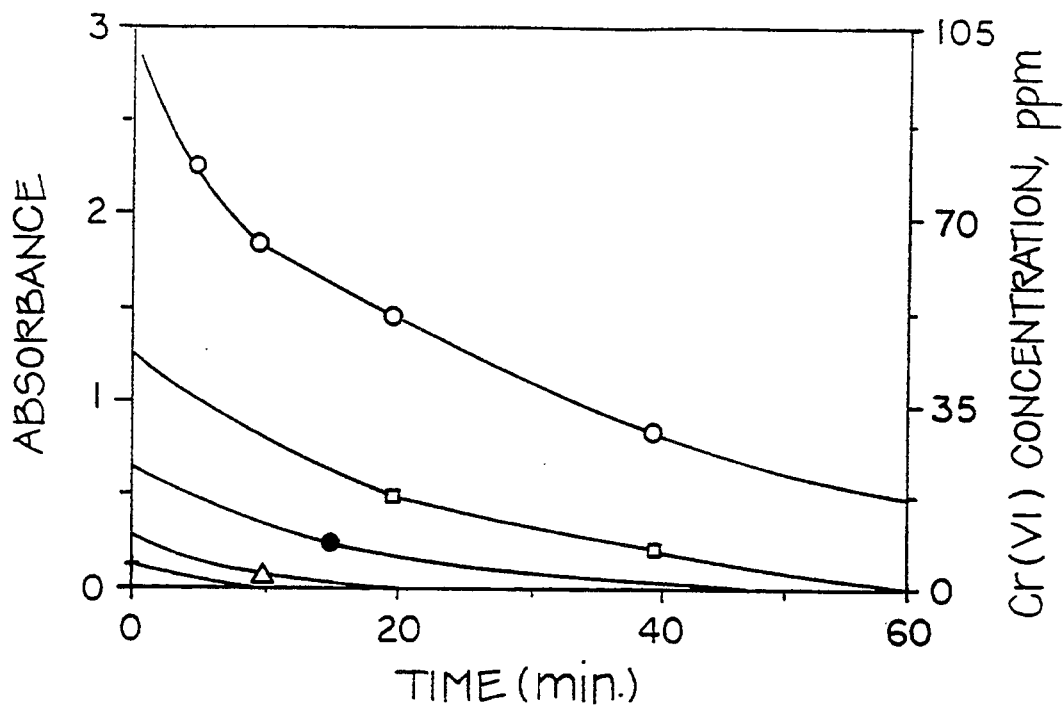
FIG. 3A and 3B show (A) Plots of dichromate absorbance (or concentration) vs. treatment time of $Ppy^0$ for different starting concentrations of dichromate in 0.1M $H_2SO_4$. (○) 104 ppm; (□) 42 ppm; (●) 21 ppm; (△) 10 ppm; (+) 5 ppm. (B) Plots of cleanup efficiency of dichromate vs. starting dichromate concentration after treatment with $Ppy^0$ films for 20 min.

FIGS. 2 and 3a show the results of treating aqueous dichromate solutions with electrically reduced polypyrrole films made as described above. Thus, FIGS. 2 and 3a contain pertinent UV-visible spectrophotometric data demonstrating the systematic decrease in the 350 nm dichromate band with time. In contrast, control experiments with a Pt mesh without the polymer reveal no change after 30 min in the solution absorbance under identical conditions (FIG. 2B). Flame atomic absorption spectroscopy (FAAS) of the dichromate solutions before and after polypyrrole treatment reveals only a slight decrease in the total chromium level in the solution. For example, in one run which corresponded to complete disappearance of the 350 nm dichromate band (cf., FIG. 2), the total chromium changed only from 104 to 98 ppm. These data are consistent with a chemical reaction route for the reduction of Cr(VI)

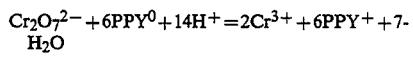

$$Cr_2O_7^{2-} + 6PPY^0 + 14H^+ = 2Cr^{3+} + 6PPY^+ + 7H_2O \quad [1]$$

That is, spontaneous electron transfer from the polypyrrole (Ppy) film to Cr(VI) results in the reduction of the latter to Cr(III). The thermodynamic driving force for reaction 1 (as written) may be computed from the standard potentials ($E^o$) of the participating species. Taking an $E^o$ value of about $-0.20$ V for the redox of polypyrrole (as determined from cyclic voltametry experiments) and the corresponding value of 1.16 V for the $Cr^{+6/+3}$ couple, the process represented by reaction 1 has a standard free energy of $-787$ kJ/mol.

A second route is suggested by the scheme in FIG. 1 and is related to the requirement of electroneutrality to be maintained in the polymer phase when it undergoes oxidation. The anions (denoted by $A^{31}$ in FIG. 1) must then move into the polymer concomitant with its oxidation. However, this "doping" process involves a competition between the anions present in the supporting electrolyte ($HSO_4^-$ in this case) and $Cr_2O_7^{2-}$. The higher negative charge favors uptake of the dichromate, although at the concentration levels of environmental significance, transport of this species probably would be swamped by the much higher levels ($\sim 100$ mM) of the $HSO_4^-$ ion. Nonetheless, x-ray photoelectron spectroscopy (XPS) reveals chromium in the polypyrrole films after the dichromate treatment. The chromium signals were monitored at binding energies of 44 eV (3p), 576 Ev, (2p$_{3/2}$), and 586 Ev (2p$_\frac{1}{2}$) in these experiments.

The polypyrrole film used in the above tests was electrochemically reduced at $-0.90$ V in 0.1M KCl. The chromium released into this solution was again sampled by flame atomic absorption spectroscopy and found to be $\sim 6$ ppm. Thus, the difference in the total chromium level in solution before and after contact with polypyrrole is accommodated by the uptake of this amount by the polymer. Upon electroreduction of the polymer, the anions are ejected into the solution. Interestingly, at the potentials needed for complete polypyrrole reduction the $Cr_2O_7^{2-}$ dopant anions are also reduced to Cr(III) such that reduction of Cr(VI) is effected by either route.

Figure 3B:
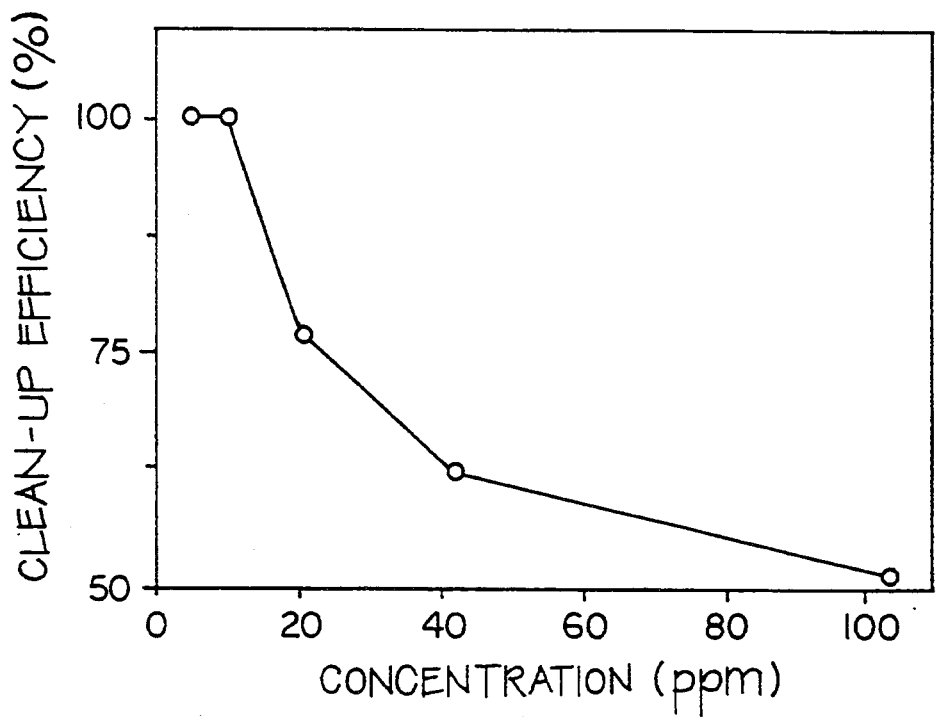

FIG. 3 contains data as a function of the original Cr(VI) levels present in solution. At Cr(VI) levels below $\sim 20$ ppm, the cleanup efficiency is 100% even for relatively short treatment durations ($<20$ min). Higher levels of Cr(VI) can be efficiently treated as long as an adequate reduction capacity is present in the polymer phase. Taking the doping level (as determined from elemental analysis) of the polymer as 0.3 (i.e., approx. one positive charge over three pyrrole rings), 16 coulombs of electrosynthesis charge translates to $7.2 \times 10^{-5}$ mols (assuming 100% polymerization efficiency). The stoichiometry of reaction 1 means that $8 \times 10^{-6}$ mols of Cr(VI) can be converted with 2 ml solution volume, an upper limit of 208 ppm can be accommodated by the polymer films in this study. Obviously, the incompleteness of the cleanup at initial Cr(VI) levels $>10$ ppm (over the time scales of the experiments in FIG. 3) is not a manifestation of inadequate reduction capacity in the polymer. Instead, once the exterior surfaces of the polymer undergo facile reaction, further progress of the conversion process is limited by mass transport of Cr(VI) into the microporous framework of the polymer phase. The use of large polymer sheets or baffles or, better still, modification of the polymer morphology to facilitate easier ion movement (Tsai et al., 1988) are possible solutions for accelerating the conversion rate.

A feature of the scheme in FIG. 1 is that the polypyrrole films, after treatment with Cr(VI), can be regenerated or recycled for repeated use by electrochemical reduction in a chromium-free electrolyte, e.g. in 0.1M Kcl. Such films revealed virtually unchanged performance levels (from those shown in FIG. 2 and 3).

The examples involved use of anodically synthesized polypyrrole films supported on a Pt mesh. Other types of configurations may be used, for example, via the use of chemically synthesized polypyrrole particles (Bose et al., 1992) which are immobilized on a suitable electrode support for potential control (cf., FIG. 1). A possible advantage with this latter type of polymer material is its high dispersity and, consequently, further improvements in reaction cross sections (see above). Flow reactors also would be more attractive from a practical process perspective. Finally, the concept as described here is illustrated for an electronically conductive polymer. However, other types of redox polymers bearing a positive charge on the polymer backbone, may be used in principle, provided the $E^o$ of the (surface) redox couple is appreciably more negative than 1.16 V, arguably not a very stringent criterion. On the other hand, the chemical stability of the polymer may prove to be a more limiting consideration. Conducting polymers such as polypyrrole, polyaniline or polythiophene combine the virtues of chemical robustness with a morphology well suited for heterogeneous reaction applications.

It is understood that redox polymers incorporating catalytic metal particles such as Pt, for example, may be formed by reacting a reduced state of a redox polymer with the oxidized state of a catalytic metal such as Pt.

The present invention, in a most preferred embodiment, offers a viable alternative to present technologies for Cr(VI) treatment. For example, the direct electrochemical reduction of Cr(VI) is not very selective and efficient; thus the extent of chromium removal on a reticulated vitreous carbon-based electrochemical column was only 51% after ten passes. (Agarwal et al., 1984). Perhaps the most widely used process at present is the chemical reduction of Cr(VI) to Cr(III) by agents such as $SO_2$, $NaHSO_3$, or $FeSO_4$. However, these (added) chemicals largely are nonrecyclable. In contrast, polypyrrole (or other conducting polymer candidates) are efficiently recycled by a simple electrochemical step. While the preferred embodiments have described the recovery of metal ions toxic to the environment, one skilled in the art understands that the invention may be employed to recover valuable metals from aqueous solutions, such as the recovery of Au, Ag or Pt.

The following references are incorporated in pertinent part by reference herein for the reasons cited above.

REFERENCES

Agarwal I. C., Rochon A. M., Gesser H. D., and Sparling A. B., Water Res., 18, 227 (1984)

Anderson R. A., Polansky M. M., Bryden N. A., Patterson K. Y., Veillon C., and Glinsmann W. H., *J. Nutrit.*, 113, 276 (1983).

Bose C.S.C., Basak S., and Rajeshwar K., *J. Electrochemical Society*, 139, L75 (1992).

Calder L. M., in *Chromium in the Natural and Human Environments*, Wiley-Interscience, New York, (1988).

*Environmental Business Journal*, Vol. IV, No. 4, April 1991.

Florence T. M. and Battey G. E., *CRC Crit. Rev. Anal. Chem.*, 9, 219 (1980).

Kanatzidis M. G., *Chem. Engg. News*, 36 (1990).

Kleber R. J. and Helz G. R., *Environ. Sci. Technol.*, 26, 307 (1992), and references therein.

Ku M. F. H. in *Aquifer Contamination and Protection Project 8.3, International Hydrological Programme*, UNESCO, Paris (1980).

Mayer M. and Schick L. L., *Environ. Sci. Technol.*, 15, 1482 (1981).

Morris B. W., Hardisty C. A., McCann J. F., Kamp G. J., and May T. W., *Atomic Spectrosc.*, 6, 149 (1985).

Schroeder D. C. and Lee G. F., *Water, Air, Soil Pollut.*, 4, (1975).

Studt T., *R & D Magazine*, 94 (1991).

Tsai E. W., Paj kossy T., Raj eshwar K., and Reynolds J. R., *J. Phys. Chem.*, 92, 3560 (1988).

It is understood that the examples and embodiments described herein are for illustrative purposes only and that various modifications in light thereof will be suggested to persons skilled in the art and are to be included within the spirit and purview of this application and scope of the appended claims.

What is claimed is:

1. A method of metal recovery from an aqueous solution comprising reaction of a metal ion with a reduced form of a redox polymer capable of reducing the metal ion and recovering reduced metal ions.

2. The method of claim 1 wherein the metal ion is a toxic waste product.

3. The method of claim 1 wherein the redox polymer is an electronically conductive polymer.

4. The method of claim 1 wherein the form of the redox polymer has an $E^o$ more negative than the $E^o$ of the metal ion.

5. The method of claim 1 where the metal ion comprises a heavy metal ion.

6. The method of claim 1 wherein the metal ion is Cd(II), Pb(II) or Hg(II).

7. The method of claim 1 wherein the metal ion is Cr(VI).

8. The method of claim 1 wherein the redox polymer is polypyrrole.

9. The method of claim 1 wherein the redox polymer is polyaniline or polythiophene.

10. The method of claim 1 wherein the redox polymer is polypyrrole and the method includes the steps of:
reacting a metal ion with reduced polypyrrole to form a reduced metal ion and polypyrrole+;
doping the polypyrrole+ by incorporation of anions;
regenerating polypyrrole from doped polypyrrole+ by electrochemical reduction; and
recovering the reduced metal ion.

11. A method of metal recovery comprising the steps of:
reacting a metal ion with reduced polypyrrole to form a reduced metal ion and polypyrrole+;
doping the polypyrrole+ by incorporation of anions;
regenerating reduced polypyrrole from doped polypyrrole+ by electrochemical reduction; and
recovering the reduced metal ion.

12. The method of claim 11 wherein the metal ion is Cr(VI) and the reduced metal ion is Cr(III).

13. The method of claim 11 wherein the metal ion is Cd(II) and the reduced metal ion is $Cd^o$.

14. The method of claim 11 wherein the metal ion is Hg(II) and the reduced metal ion is $Hg^o$.

15. The method of claim 11 wherein the metal ion is Pb(II) and the reduced metal ion is $Pb^o$.

16. The method of claim 10, 11, 12, 13, 14 or 15 wherein the reduced metal ion is recovered by sorption, precipitation, immobilization or electrochemical stripping.

17. A method of Cr(VI) recovery comprising the steps of:
reacting Cr(VI) with reduced polypyrrole to form Cr(III) and polypyrrole+;
doping the polypyrrole+ by incorporation of anions;
separating the doped polypyrrole+ from the Cr(III);
regenerating reduced polypyrrole from the separated polypyrrole+ by electrochemical reduction; and
recovering the Cr(III) by sorption or precipitation.

18. A method of reducing the valence of a heavy metal ion from a first ionic valence form to a second ionic valence form, wherein both forms are water soluble, which comprises:
contacting an aqueous solution of a heavy metal in a first valence form with a film of a reduced redox polymer having a sufficiently negative potential to reduce said first valence form, said contacting being for a time sufficient to reduce the first valence form to the second valence form;
separating the resulting solution from the polymer film; and
regenerating the reduced redox polymer from the resulting separated polymer film by electrochemical reduction.

19. A method of reducing the toxicity of an aqueous solution of a toxic metal ion which comprises:
contacting a solution of a toxic metal ion with a film of reduced redox polymer having an electrode potential sufficiently negative to reduce the valence of the metal ion to a lower, less toxic valence; such contacting being for a time sufficient for the reduced valence metal ion to be formed; and
separating the resulting solution from the resulting film.

20. The method of claim 19 which further comprises: recovering the metal in its lower valence form from the resulting solution when the lower valence form is soluble in the resulting solution.

21. The method of claim 19 which further comprises: electrochemically oxidizing the metal in its lower valence form when the lower valence form exists as a deposit the resulting film;

removing the oxidized metal from said resulting firm; and electrochemically reducing the resulting film following such removal.

22. The method of claim 19 wherein the toxic metal ion comprises Cr(VI), and the redox polymer comprises polypyrrole having an $E^o$ more negative than 1.16 V.

23. A redox polymer having incorporated reduced metal ions formed by reacting a reduced redox polymer with oxidized metal ions.

24. The method of claim 10, 11 or 17 where the anions comprise anions present in a supporting electrolyte.

25. The method of claim 10, 11 or 17 where the anions are $HSO_4^-$ anions.

* * * * *